United States Patent [19]
Agari

[11] Patent Number: 5,340,219
[45] Date of Patent: Aug. 23, 1994

[54] LINEAR MOTION ROLLING GUIDE UNIT

[75] Inventor: Norimasa Agari, Seki, Japan

[73] Assignee: Nippon Thompson Co., Ltd., Tokyo, Japan

[21] Appl. No.: 170,857

[22] Filed: Dec. 21, 1993

[30] Foreign Application Priority Data

Dec. 28, 1992 [JP] Japan .............................. 4-092955[U]

[51] Int. Cl.⁵ ............................................. F16C 29/06
[52] U.S. Cl. ......................................... 384/15; 384/45
[58] Field of Search ................. 384/15, 43, 44, 45

[56] References Cited

U.S. PATENT DOCUMENTS

| | | | |
|---|---|---|---|
| 4,921,358 | 5/1990 | Kasuga et al. | 384/15 |
| 5,080,498 | 1/1992 | Tsukada | 384/15 |
| 5,149,205 | 9/1992 | Tsukada | 384/15 |

FOREIGN PATENT DOCUMENTS 98321 10/1991 Japan .
118317 12/1991 Japan .
121220 12/1991 Japan .

Primary Examiner—Thomas R. Hannon
Attorney, Agent, or Firm—Browdy and Neimark

[57] ABSTRACT

The linear motion rolling guide unit utilizes the retainer bands for the rolling elements in positioning the under seals correctly with respect to the end caps and in facilitating the reliable mounting of the under seals onto the end caps. The end caps are formed with laterally extending first engagement grooves and vertically extending second engagement grooves. The core members of the under seals are formed at their longitudinal ends with brackets, each of which has a depressed portion for receiving the retainer band. The brackets are fitted into the second engagement grooves to place the under seals on the underside of the end caps. Then, the retainer bands are fitted into the first engagement grooves and into the depressed portions of the brackets to securely mount the under seals to the end caps.

8 Claims, 3 Drawing Sheets

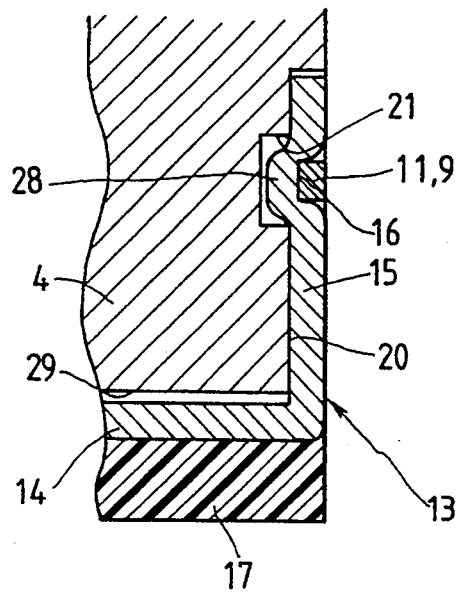
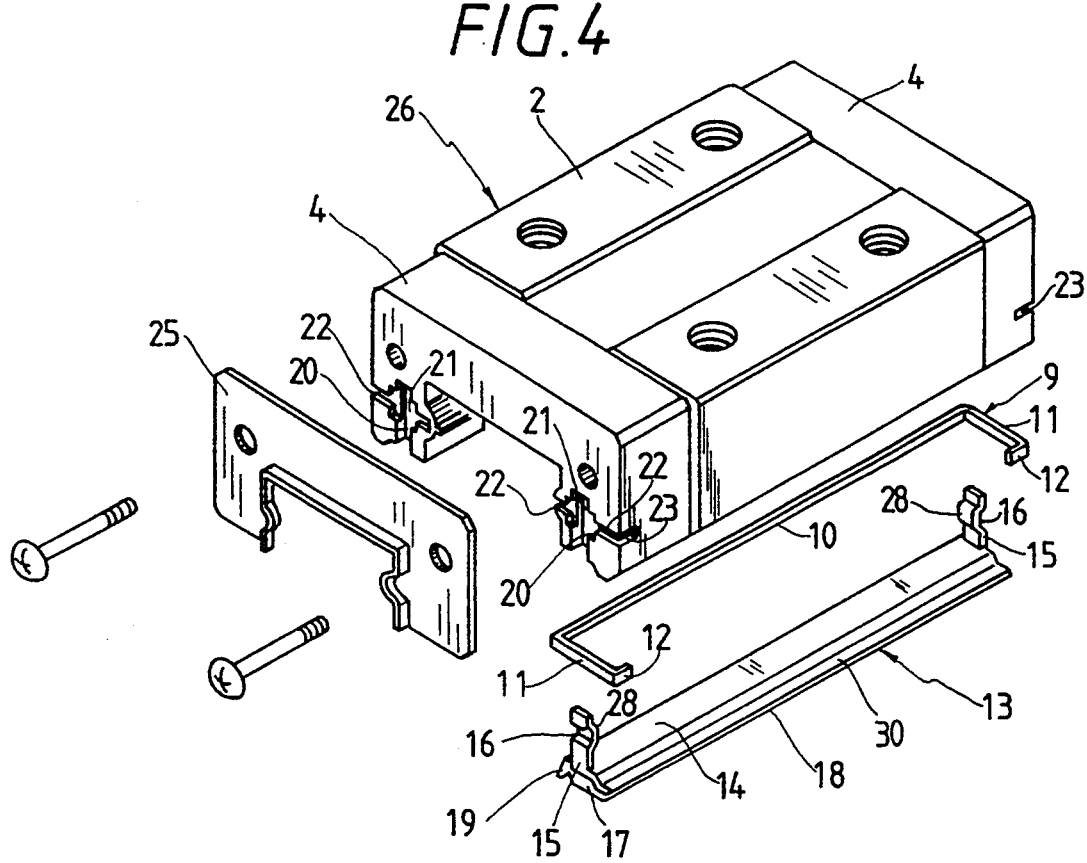

LINEAR MOTION ROLLING GUIDE UNIT

BACKGROUND OF THE INVENTION

1. Field of the Invention

The present invention relates to a linear motion rolling guide unit, which is applied to a variety of relatively sliding portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and by under seals attached to the underside of the slider.

A linear motion rolling guide unit as shown in FIG. 6 is known. FIG. 6 shows a perspective view of one example of a conventional linear motion rolling guide unit.

As shown in the FIG. 6, the linear motion rolling guide unit includes a track rail 1 having raceway grooves 7 extending longitudinally on both side wall surfaces 5 thereof, and a slider 26 slidably mounted astride on the track rail 1. The slider 26 includes a casing 2, which has raceway grooves 6 formed at positions facing the raceway grooves 7 on the track rail 1, end caps 31 attached to the longitudinal ends of the casing 2, rolling elements 8 trapped and running between the opposing raceway grooves 6 and 7, retainer bands for keeping the rolling elements 8 from coming off the raceway grooves, and under seals 3 having seal portions. The end cap 31 has an end seal 25 for sealing between the track rail 1 and the slider 26. The end cap 31 is also provided with a grease nipple 24 for supplying lubricant to the sliding surfaces between the track rail 1 and the slider 26. To prevent the rolling elements 8 from coming off the casing 2, the retainer bands are provided to the casing 2 in such a way as to enclose the rolling elements 8. The under seals 3 are arranged at the underside of the slider 26 to seal between the casing 2 and the longitudinally extending sidewall surfaces 5 of the track rail 1 and to seal the undersides of the casing 2 and the end caps 31.

The slider 26 is mounted astride on the track rail 1 and freely slides on it by means of the rolling elements 8 that circulate along the raceways formed between the raceway grooves 7 on the track rail 1 and the raceway grooves 6 on the casing 2. The rolling elements 8 that travel loaded along the raceway grooves 7 of the track rail 1 are led to direction changing passages formed in the end caps 31 and further to return passages 27 formed in the upper part of the casing 2 parallel to the raceway grooves 6. Thus, the rolling elements 8 run endlessly through circulating passages. In this way, the slider 26 is allowed to slide relative to the track rail 1 by the rolling elements 8 traveling loaded between the raceway grooves 6 on the casing 2 and the raceway grooves 7 on the track rail 1.

The under seal 3 is mounted to the casing 2 by rivets and thus is difficult to mount or dismount. The under seal 3, though it has an advantage of being simple in construction and easily manufactured, also has drawbacks that because the under seal 3 is thin, it is easily deformed by external forces and by positioning errors between it and the casing 2 and track rail 1, the casing and track rail having the raceway grooves 6, 7 respectively.

In a dust prevention structure of a linear motion bearing apparatus disclosed in the Japanese Utility Model Laid-Open No. 98321/1991, the under seal is bent inwardly at both axial ends to make it U-shaped and is provided at the bent surfaces with inwardly protruding engagement projections, and the end caps are formed at their outer surfaces with recesses for receiving the engagement projections.

In an under seal apparatus for a linear motion guide bearing disclosed in the Japanese Utility Model 118317/1991, axial ends of the under seal are formed with axially extending projections and end seals are formed at their lower end surfaces with engagement holes for receiving the projections of the under seal. Fitting the under seal into the end seals that have high strength makes the mounting and dismounting of the under seal easy and at the same time increases the strength of the under seal.

In another under seal apparatus for a linear motion guide bearing disclosed in the Japanese Utility Model 121220/1991, the axial ends of the under seal are provided with two-pronged projections protruding toward the underside of the slider, the two prongs being elastically deformable toward and away from each other. The slider has the axial end portions of the underside thereof formed with vertical holes, into which the two-pronged projections of the under seal are fitted, and also with through-holes that intersect the vertical holes perpendicularly and pass through the arm or wing portions of the slides. One of the two prongs fitted into the vertical holes is elastically deformed in the vertical holes, thereby urging the under seal toward the side wall of a guide rail to bring the edge of the under seal into sliding contact with the guide rail.

The above under seal apparatuses for the linear motion guide bearings mount the under seal by fitting the projections or prongs of the under seal into the engagement holes in the slider or end seals.

The conventional linear motion rolling guide units generally have the construction in which the longitudinal ends of the under seal are fitted into the engagement holes in the end caps or end seals to mount the under seal to the end seals and in which the dust sealing member and the slider are made of different materials with different thermal expansions. Because of this, when the thermal expansion of the dust sealing member becomes larger than that of the slider, the dust sealing member will be deflected creating a gap between it and the guide rail or the underside of the casing, with the result that the sealing performance deteriorates, unable to prevent ingress of dust. That is, there must be some play for the under seal to move relative to the undersides of the casing and end caps so that the longitudinal elongation of the under seal due to thermal expansion difference between these parts can be offset by the engagement holes in the end caps or end seals. Otherwise, the under seal would be deformed as by buckling, degrading the sealing performance.

The conventional linear motion rolling guide unit, however, has the construction in which the projections of the under seal are engaged in the engagement holes in the end caps or end seals in such a way that they cannot move in the longitudinal direction. Further, since the under seal adheres to the undersides of the casing and end caps, the under seal cannot move causing deformations to the under seal and degrading the sealing performance. Furthermore, the conventional linear motion rolling guide unit, though it may facilitate the mounting and dismounting of the under seal, may not necessarily be able to position the under seal correctly and also has a problem that the under seal will be deformed by temperature variations and by swelling due to exposure to lubricants, deteriorating the sealing performance.

SUMMARY OF THE INVENTION

In a linear motion rolling guide unit which has a slider mounted astride on and slidable relative to the track rail, a major objective of this invention is to provide a linear motion rolling guide unit, which utilizes retainer bands for a number of rolling elements circulating along the raceways between the track rail and the slider to facilitate the reliable mounting and dismounting of the under seals to and from the end caps; which assures easy, reliable positioning of the under seals when they are mounted to the slider; and which enables the under seals to exhibit a good sealing performance.

Another objective of this invention is to provide a linear motion rolling guide unit, which comprises:

a track rail having raceway grooves formed on longitudinally extending side wall surfaces thereof;

a casing slidable relative to the track rail and having second raceway grooves formed at positions facing the first raceway grooves;

end caps mounted to the longitudinal ends of the casing;

rolling elements running through raceways formed between the opposing raceway grooves;

retainer bands for keeping the rolling elements from coming off the raceways; and under seals arranged on the undersides of the casing and the end caps to seal between the track rail and the casing and end caps;

wherein the end caps are formed with laterally extending first engagement grooves for receiving the retainer bands, with locking grooves for receiving locking detents of the retainer bands, and with vertically extending second engagement grooves intersecting the first engagement grooves;

wherein the under seals have sealing members made of elastic materials, core members secured to the sealing members, and brackets which extend upwardly at both longitudinal ends of the core members to fit into the second engagement grooves; and wherein at positions where the retainer bands cross the brackets, the brackets are formed with depressed portions for receiving the retainer bands.

Mounting the under seals to the end caps involves the following steps. The brackets of the under seals are fitted into the second engagement grooves formed in the end caps to bring the under seals into contact with the undersides of the end caps and casing. Then, the retainer bands are installed into the first engagement grooves formed in the end caps and into the depressed portions of the brackets of the under seals to fit the locking detents formed at the ends of the retainer bands into the locking grooves formed in the outer surfaces of the end caps. With the use of the retainer bands, it is possible to mount and dismount the under seals to and from the end caps easily and reliably.

The retainer bands installed in the depressed portions of the brackets suspend the under seals, thus ensuring secure mounting of the under seals to the end caps.

In the process of assembling the under seals to the slider, because the locking portions of the retainer bands are fitted into the depressed portions of the brackets-which themselves are installed in the second engagement grooves in the end caps-in such a way that the locking portions intersect the brackets and press them from outside, the under seals mounted to the end caps can reliably be held in place by the rolling element retainer bands- The retainer bands, therefore, serve two purposes, i.e. retaining the rolling elements and holding the under seals firmly. This contributes to reducing the number of parts of the slider assembly and therefore the cost.

During the process of assembling the under seals to the slider in this linear motion rolling guide unit, the under seals can be positioned easily and reliably as follows. The lateral positioning of the under seals is achieved by the engagement between the both lateral side surfaces of the brackets of the under seals and the corresponding both lateral side surfaces of the second engagement grooves formed in the end caps, in which the brackets are fitted. The vertical positioning of the under seals, on the other hand, is accomplished by the engagement between the upper surfaces of the retainer bands and the upper surfaces of the depressed portions of the brackets. If the backs of the depressed portions of the brackets are raised, it is preferred that the engagement holes be formed in the bottom of the second engagement grooves to receive the raised portions of the brackets. This structure assures reliable and firm positioning of the under seals in the vertical direction. In this way, the under seals can be easily and reliably positioned for mounting to the end caps.

With the under seals mounted to the end caps, the lip portions of the under seals are brought into contact with the undersides of the end caps and casing by the elasticity of the core members of the under seals. Further, other lip portions provided on the side opposite to the first lip portions are in contact with the longitudinally extending side wall surfaces of the track rail. These lip portions seal gaps between the track rail and the slider, preventing ingress of foreign matters such as dust and dirt into the sliding portions.

The depressed portions of the brackets as well as the raised portions at the back of the depressed portions are formed by pressing, and the engagement holes are formed at the bottom of the second engagement grooves to receive the raised portions of the brackets.

Further, the retainer bands and the brackets of the under seals have elasticity, which allows the under seals to be elastically mounted to the end caps so that when subjected to external force or thermal expansion or swelling due to exposure to lubricants, the under seals can offset such expansions or contractions to avoid possible buckling or bending, thereby maintaining the sealing performance.

The elasticity of the brackets and the core members of the under seals brings the seal members of the under seals into sealing contact with the undersides of the end caps and casing. The lip portions of the under seals are in sealing contact with the longitudinally extending side wall surfaces of the track rail to further enhance sealing function. Because of their elastic contact, the under seals can reliably seal gaps between the track rail and the slider, protecting the sliding portions against ingress of foreign substances such as dirt and dust. As mentioned above, the under seals of this invention is characterized by the good sealing performance.

BRIEF DESCRIPTION OF THE DRAWINGS

FIG. 3 is a fragmentary cross section taken along the line A—A of FIG. 1;

FIG. 4 is an exploded perspective view of the slider of the linear motion rolling guide unit of this invention;

DETAILED DESCRIPTION OF THE EMBODIMENT

Figure 1:
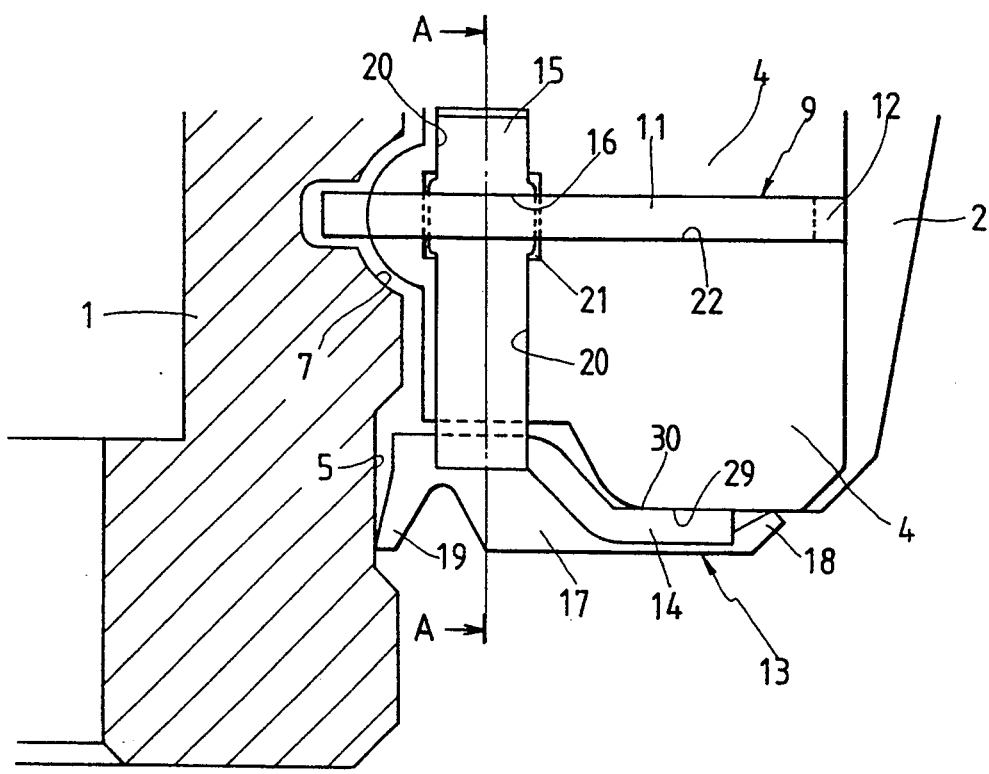
FIG. 1 is a fragmentary cross section showing a part of the linear motion rolling guide unit as one embodiment of the present invention.

Now, one embodiment of the linear motion rolling guide unit according to this invention will be described by referring to FIGS. 1, 2, 3, 4 and 5. In these figures components having the same functions or actions as those in FIG. 6 are assigned like reference numerals.

Figure 6:
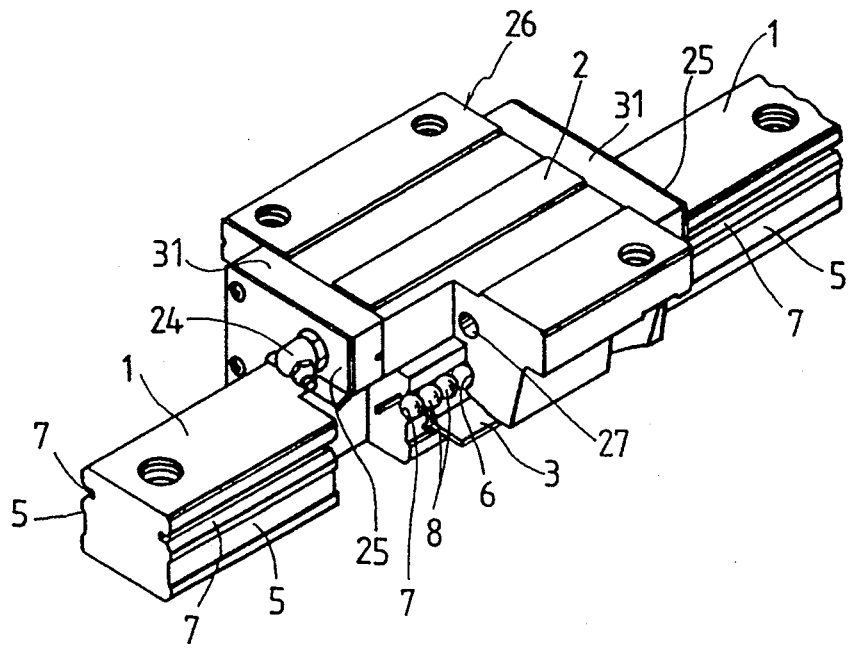
FIG. 6 is a perspective view of one example of a conventional linear motion rolling guide unit.

The linear motion rolling guide unit of this invention is basically the same in construction as the linear motion rolling guide unit of FIG. 6 and is characterized in the construction in which the under seal 3 or 13 is mounted to the end caps 4. The linear motion rolling guide unit of this invention comprises, like the one shown in FIG. 6, a track rail 1 having raceway grooves 7 extending longitudinally on both side wall surfaces 5 thereof; and a slider 26 slidable relative to the track rail 1. The slider 26 includes a casing 2 slidable relative to the track rail 1 and having raceway grooves 6 at positions facing the raceway grooves 7; rolling elements 8 running through raceways formed between the opposing raceway grooves 6 and 7; end caps 4 attached to the longitudinal ends of the casing 2; end seals 25 attached to the external surface of the end caps 4; and under seals 13 mounted to the end caps 4.

The end caps 4 are mounted to the end surfaces of the casing 2 by passing screws into mounting holes in the ends of the casing 2. The end caps 4 are formed with direction changing passages for changing the direction of travel of the balls 8 so that they can circulate endlessly in the raceways between the casing 2 and the track rail 1. The casing 2 and the end caps 4 are formed with a recess to accommodate the track rail 1 when they straddle the track rail. The under seal 13 consists of a seal member 17 made of such elastic materials as rubber and plastics that has a function of sealing the track rail 1, end caps 4 and casing 2; a core member 14 secured to the seal member 17; and a bracket 15 formed integral with and extending from the longitudinal ends of the core member 14. The seal member 17 of the under seal has a lip portion 19 on the track rail side that bears sealingly on the longitudinally extending side wall surface 5 of the track rail 1 and another lip portion 18 on the side opposite the track rail that bears sealing on the undersides of the casing 2 and the end caps 4.

On its far side from the casing 2, each of the end caps 4 has vertically extending second engagement grooves 20 formed at positions close to the track rail 1 to receive the brackets 15 that extend upward from the ends of the under seals 13. In addition to the second engagement grooves 20, the end cap 4 is also formed with laterally extending first engagement grooves 22 for receiving the bracket 15 and for securely receiving the retainer band 9, the first engagement grooves 22 crossing the vertically extending second engagement grooves 20 at right angles. The portion of the bracket 15 that is intersected by the locking portion 11 of the retainer band 9 is depressed as indicated by 16 for receiving the locking portion 11 of the retainer band 9. The depressed portion 16 of the bracket 15 is formed by pressing. On the back of the depressed portion 16, the bracket 15 is raised as indicated by 28.

The end cap 4 has engagement recesses 21 formed at the bottom of the second engagement grooves 20 to receive the raised portions 28 of the brackets 15. The relation between the raised portion 28 of the bracket 15 and the engagement recess 21 in the second engagement groove 20 is preferably such that when the raised portion 28 is fitted into the engagement recess 21, the under seal 13 can be positioned in the vertical direction.

Figure 2:
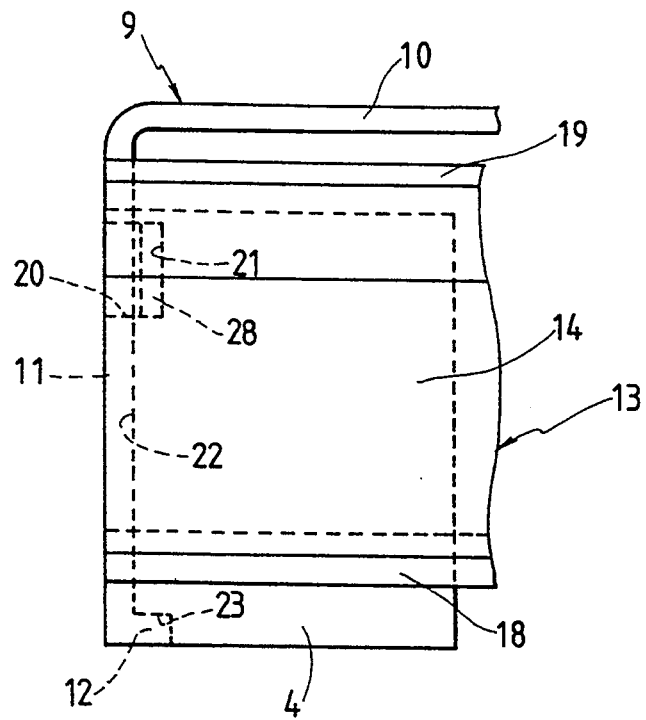
FIG. 2 is a bottom view showing a part of the linear motion rolling guide unit of FIG. 1.
Figure 5:
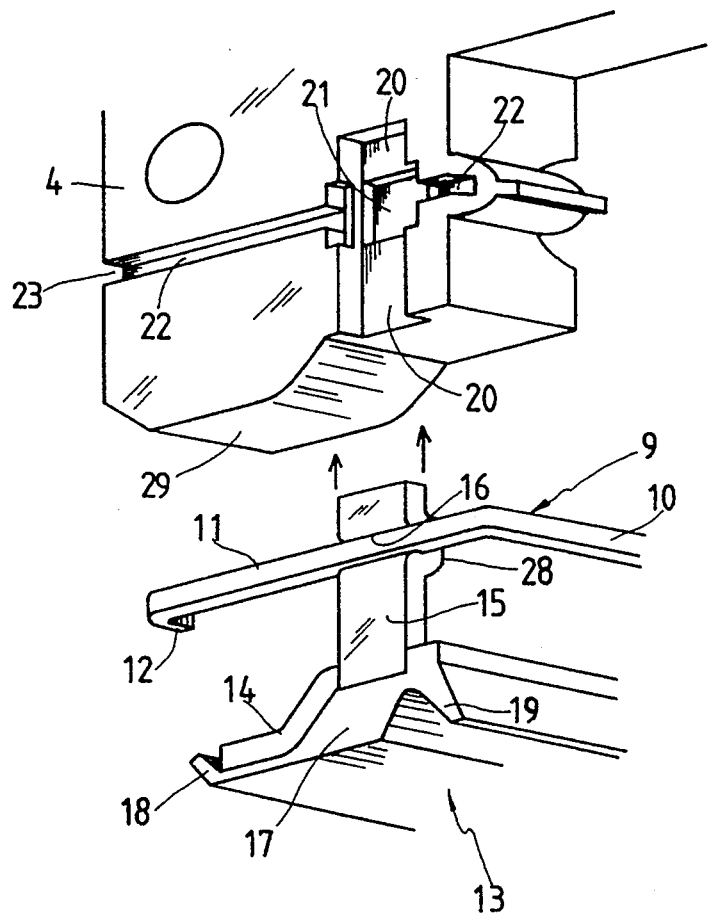
FIG. 5 is an enlarged exploded perspective view showing a part of the end cap and under seal of FIG. 4 in the disassembled condition.

At those ends of the first engagement grooves 22 formed in the end cap 4 that are remote from the track rail side, the end cap 4 is formed with locking grooves 23 for receiving locking detents 12 of the retainer bands 9. While the locking grooves 23 are shown in FIGS. 1, 2 and 4 to have the form of grooves provided on the outer side of the end cap 4 remote from the track rail 1, they may take other forms. For example, they may be holes formed in an intermediate portion of the first engagement groove 22 of the end cap 4. In that case, the locking detents 12 of the retainer band 9 are engaged in the hole-like locking grooves 23 to fasten the retainer band 9 to the end caps 4.

The retainer band 9, which prevents the rolling elements 8 from coming off the raceway grooves 6 in the casing 2, consists of a retaining portion 10 that retains the rolling elements 8; locking portions 11 which are formed by bending the ends of the retaining portion 10 at right angles laterally outwardly; and locking detents 12 formed by bending the outer ends or free ends of the locking portions 11 longitudinally inwardly toward the casing 2. The locking portion 11 and the locking detents 12 fit into the first engagement groove 22 and the locking groove 23 formed in the end cap 4.

In the linear motion rolling guide unit with the construction described above, the under seal 13 is mounted to the end caps 4 in the following steps. The brackets 15 of the under seal 13 are pushed into the second engagement grooves 20 formed in the end caps 4 to place the under seal 13 on the undersides of the end caps 4. In this state, the raised portion 28 at the back of the depressed portion 16 of the bracket 15 is fitted into the engagement recess 21 at the bottom of the second engagement groove 20. The depressed portion 16 is so formed that its surface is flush with the bottom surface of the first engagement groove 22 in the end cap 4. The ends of the locking portions 11 of the retainer band 9 are slightly expanded in a direction that causes the retaining portion 10 to retain the rolling elements 8. The retainer band 9 is then fitted in the first engagement grooves 22 in the end caps 4 and in the depressed portion 16 of the bracket 15.

With the under seal 13 mounted to the end caps 4 as described above, the upper surface 30 of the under seal 13 is pressed against the undersides 29 of the casing 2 and the end caps 4 by the elastic force of the core member 14. At the same time, the lip portion 18 of the under seal 13 bears tightly on the undersides 29 of the casing 2 and the end caps 4 while the other lip portion 19 comes into sealing contact with the side wall surface 5 of the track rail 1. In this way, the under seals 3 offer improved sealing for the track rail and the slider. Because the locking portions 11 of the retainer band 9 engage with the depressed portions 16 of the brackets 15, the brackets 15 of the under seal 13 are not only held to the end caps 4 but also suspended by the locking portion 11 the retainer band 9, ensuring correct positioning and reliable and elastic mounting of the under seal 13 to the end caps 4.

We claim:

1. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements running through raceways formed between the first raceway grooves and the second raceway grooves;
   retainer bands having at both ends thereof locking detents engaging with the end caps, the retainer bands keeping the rolling elements from coming off the raceways; and
   under seals arranged on the undersides of the casing and the end caps, the under seals including seal members for sealing between the track rail and the casing and end caps and core members secured to the sealing members;
   wherein the end caps are formed with laterally extending first engagement grooves for receiving the retainer bands, with locking grooves for receiving locking detents of the retainer bands, and with vertically extending second engagement grooves intersecting the first engagement grooves;
   wherein the core members of the under seals have brackets which extend upwardly at both longitudinal ends of the core members to fit into the second engagement grooves; and
   wherein at positions where the retainer bands cross the brackets, the brackets are formed with depressed portions and with raised portions at the back of the depressed portions, and the retainer bands fit in and intersect the depressed portions of the brackets.

2. A linear motion rolling guide unit according to claim 1, wherein the lateral-direction positioning of the under seals with respect to the end caps is achieved by the engagement between both lateral side surfaces of the brackets of the under seals and corresponding both lateral side surfaces of the second engagement grooves in the end caps in which the brackets are fitted.

3. A linear motion rolling guide unit according to claim 1, wherein the vertical-direction positioning of the under seals with respect to the end caps is achieved by the engagement between upper surfaces of the retainer bands and corresponding upper surfaces of the depressed portions of the brackets.

4. A linear motion rolling guide unit according to claim 1, wherein the raised portions of the brackets are fitted into holes formed in the bottom of the second engagement grooves.

5. A linear motion rolling guide unit according to claim 4, wherein the vertical-direction positioning of the under seals with respect to the end caps is achieved by fitting the raised portions of the brackets into the holes formed in the bottom of the second engagement grooves.

6. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements running through raceways formed between the first raceway grooves and the second raceway grooves;
   elastic retainer bands having at both ends thereof locking detents engaging with the end caps, the retainer bands keeping the rolling elements from coming off the raceways; and
   under seals arranged on the undersides of the casing and the end caps, the under seals including seal members for sealing between the track rail and the casing and end caps and core members secured to the sealing member, the seal members having lip portions;
   wherein the end caps are formed with laterally extending first engagement grooves for receiving the retainer bands, with locking grooves for receiving locking detents of the retainer bands, and with vertically extending second engagement grooves intersecting the first engagement grooves;
   wherein the core members of the under seals have elastic brackets which extend upwardly at both longitudinal ends of the core members and which fit into the second engagement grooves; and
   wherein at positions where the retainer bands cross the brackets, the brackets are formed with depressed portions and with raised portions at the back of the depressed portions, and the retainer bands fit in and intersect the depressed portions of the brackets.

7. A linear motion rolling guide unit according to claim 6, wherein the elasticity of the retainer bands and of the brackets of the under seals allows the under seals to be mounted elastically to the end caps, and also offsets the elongation and contraction of the under seals.

8. A linear motion rolling guide unit according to claim 6, wherein when the under seals are mounted to the end caps, the lip portions of the elastic seal members of the under seals sealingly engage with the undersides of the casing and the end caps and with the side wall surfaces of the track rail by the brackets of the core members of the under seals and by the elasticity of the brackets.

* * * * *